H. B. ASHELMAN & J. S. JOHNSON.
AIR VALVE AND INDICATING MECHANISM.
APPLICATION FILED APR. 28, 1914.
1,140,937.
Patented May 25, 1915.
2 SHEETS—SHEET 2.
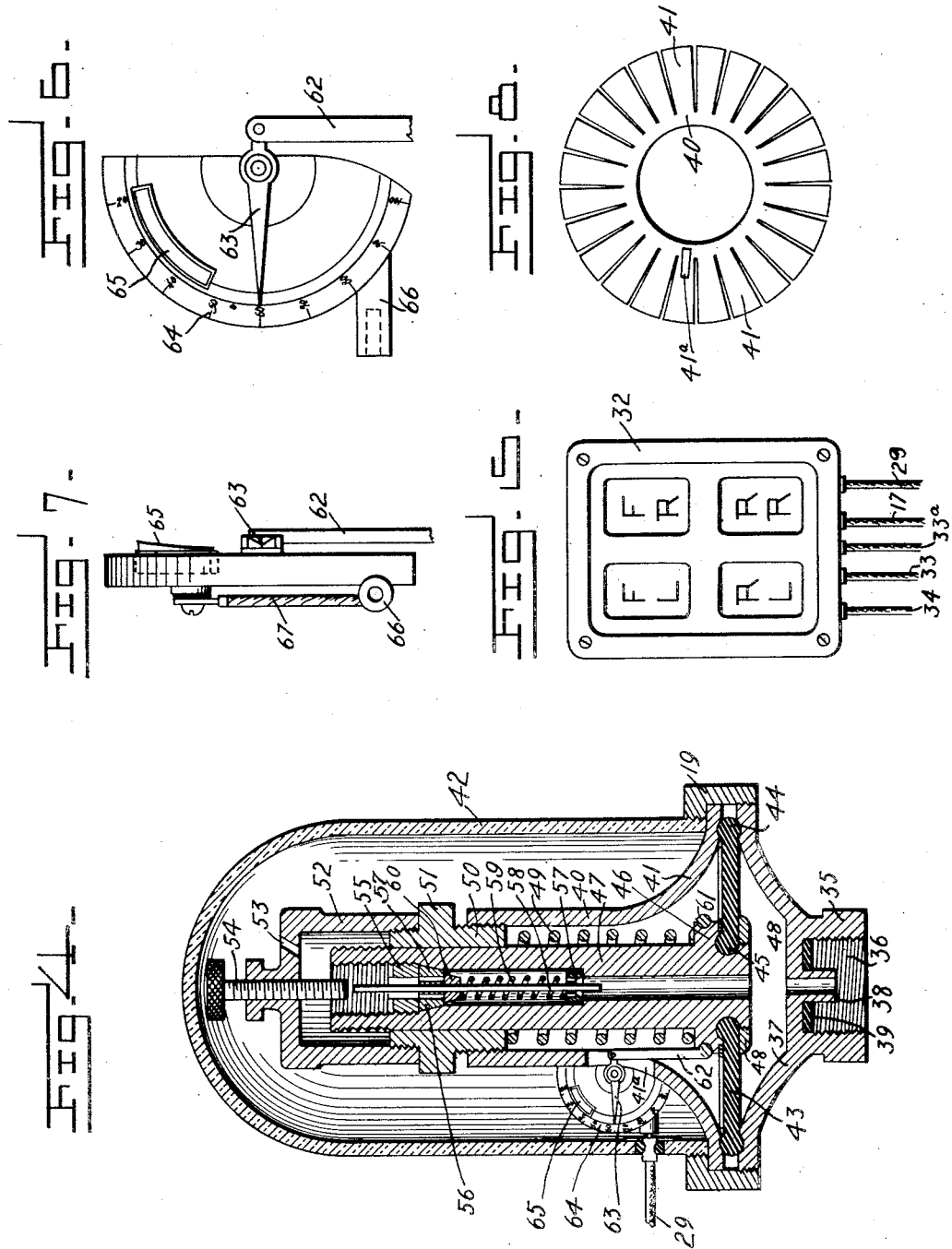
WITNESSES
INVENTORS
HERVEY BOWES ASHELMAN.
JOHN SANDFORD JOHNSON.
BY
ATTORNEYS

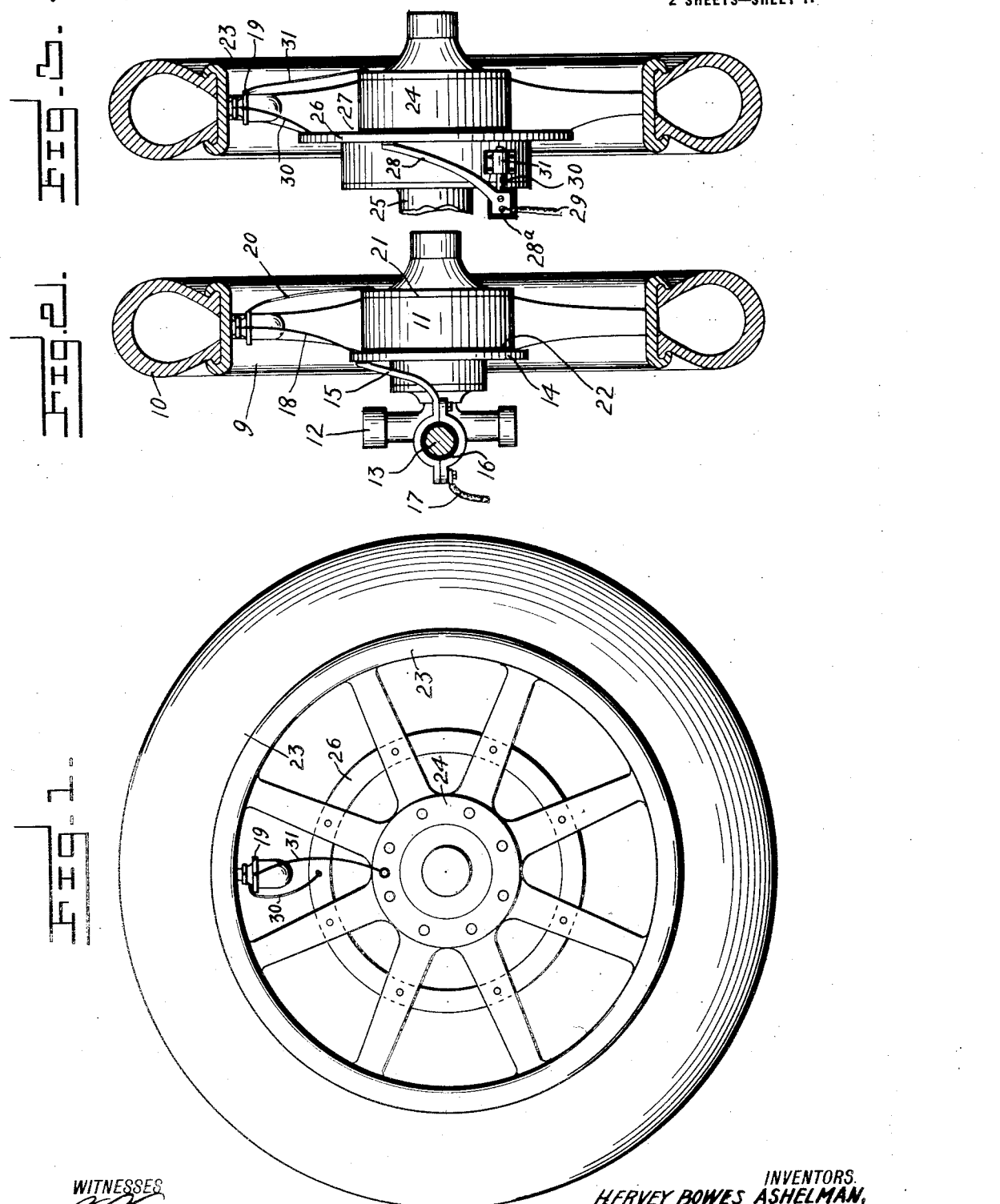

UNITED STATES PATENT OFFICE.

HERVEY BOWES ASHELMAN AND JOHN SANDFORD JOHNSON, OF FARGO, NORTH DAKOTA.

AIR-VALVE AND INDICATING MECHANISM.

1,140,937.     Specification of Letters Patent.     Patented May 25, 1915.

Application filed April 28, 1914. Serial No. 835,018.

*To all whom it may concern:*

Be it known that we, HERVEY BOWES ASHELMAN and JOHN SANDFORD JOHNSON, citizens of the United States, and residents of the city of Fargo, in the county of Cass and State of North Dakota, have invented certain new and useful Improvements in Air-Valves and Indicating Mechanisms, of which the following is a specification.

Our invention relates to air valves of a type suitable for use in connection with pneumatic tires, and to indicating mechanisms associated with such valves and tires, for indicating the amount of air pressure contained within the tires.

More particularly stated, we seek to produce an improved air valve, to be mounted upon a wheel such as an automobile wheel, and connected with a pneumatic tire carried by such wheel, the air valve being provided with indicating mechanism for disclosing the amount of air pressure carried by the tire.

Our invention further comprehends an electric indicator, having the form of an annunciator and connected with different air valves carried by the respective wheels of the automobile, in such manner as to apprise the operator whenever the air pressure within any one of the tires exceeds a predetermined safe limit—the annunciator indicating the particular tire affected.

Our invention further contemplates improvements in the structure of the air valve employed, and to means for connecting certain movable parts of the air valve with the various indicating mechanisms.

Reference is made to the accompanying drawings forming a part of this specification, and in which like letters indicate like parts.

Figure 1 is a side elevation of one of the rear wheels of an automobile, provided with our improved air valves—this view showing also a portion of the electric connections for the air valve in question. Fig. 2 is a vertical section through a front wheel of the automobile, showing the air valve and some of the electric connections for the valve. Fig. 3 is a vertical section through a rear wheel of the automobile, said wheel being provided with our improved air valve and with electric connections associated therewith. Fig. 4 is a vertical section through the air valve. Fig. 5 is a front elevation of the annunciator, forming a part of the electric indicating mechanism. Fig. 6 is a detail view, showing in front elevation a part of the indicating mechanism located within the valve casing. Fig. 7 is a side elevation of the mechanism shown in Fig. 6. Fig. 8 is a plan view of the spider forming a part of the valve mechanism.

A front wheel of the automobile is shown at 9, and is provided with a pneumatic tire 10 and with a hub 11. A wheel pivot appears at 12, and a part of the chassis at 13. The hub 11 carries a slip ring 14, and engaging this slip ring is a brush 15, this brush being carried by the chassis member 13, and insulated therefrom by a sleeve 16 of insulating material. A wire 17 is connected with the brush 15. Another wire 18 is secured to the slip ring 14 and leads therefrom to an air valve 19. From the air valve a wire 20 leads to a hub 21 which serves practically as a ground return, as hereinafter described. The slip ring 14 is insulated from the hub 21 by a ring 22 of dielectric material.

A rear wheel of the automobile appears at 23 and is provided with a hub 24, the latter being carried upon a rear axle 25. A slip ring 26 of conducting material is carried by a ring 27 of insulating material. A brush 28 slidably engages the slip ring 26 and is mounted upon an insulating member 28ᵃ and connected with a wire 29. The brush 28 is carried upon a stem 30 which engages a bearing 31. An annunciator is shown at 32, (see Fig. 5) and connected with this annunciator are the wires 17 and 29, two similar wires 33, 34. Each of the four wires last mentioned leads from the annunciator to some one of the four wheels of the automobile. The annunciator is provided with four drops, indicated, respectively, by the legends FL, FR, RL, and RR, these legends, respectively, being abbreviations of the expressions front left, front right, rear left, and rear right, and thus indicating the respective wheels of the automobile. The wire 29 communicates with the drop FR, the wire 17 with the drop RR, the wire 34 with the drop FL, and the wire 33 with the drop RL. When any one of the four wires is energized, the appropriate drop exhibits its legend.

In Fig. 5 all four of the drops are shown as displaying their respective legends. A wire 33ª leads from the annunciator to the frame of the machine, and thus acts as a common return for each and all of the four wires.

The valve 19 is provided with a base 37 having a neck 35 integral with it and upon which it is supported. This neck is provided internally with a thread 36 and with a nipple 38. A washer 39 is located within the neck 35, and encircles the nipple 38. A spider 40, having a general horn-shape, is provided at its bottom with a number of diverging fingers 41 integral with it, and is further provided with a slot 41ª. A dome 42, made of celluloid, covers practically all of the different parts of the valve structure.

A diaphragm 43, made preferably of rubber and having a general annular form, is provided at its peripheral edge with an annular bead 44, and at its inner edge with another annular bead 45. The annular bead 45 encircles a head 46 carried by, and integral with, a sleeve 47, and held in position by a nut 48 of annular form. A spiral spring 49 encircles the sleeve 47 and is engaged by an annular nut 50, the latter having an angular portion 51 to be engaged by a wrench and turned, in order to adjust the tension of the spring 49. The upper end of the nut 50 is threaded externally, and fitting upon it is a cap 52 which is provided with a vent hole 53. An adjusting screw 54 extends through the top of the cap 52, and by turning this screw it may be raised or lowered relatively to the cap.

The upper portion of the sleeve 47 is threaded internally and carries a nut 55 of annular form. Below this nut is a spider 56. Another spider 57 is located within the sleeve 47, and extending through the spider 57 is a rod 58. Engaging the spider 57 and encircling the rod 58 is a spiral spring 59 which also engages a valve member 60, this valve member being carried by the rod 58. The spring 59 normally presses the valve member 60 against the spider 56, which thus serves as a valve seat. By removing the nut 55, this valve seat can be taken out.

By adjusting the tension of the spring 49, the sensitiveness of the diaphragm 43 can be controlled at the will of the operator. By adjusting the screw 54, the operator can adjust the degree of movement necessary for the sleeve 47 to travel in the general direction of its length before the rod 58 encounters the screw 50, and this dislodges the valve member 60 from its seat. Encircling the head 46, at the lower end of the sleeve 47, is a ring 61, and extending upwardly from this ring is an arm 62. Pivotally connected with this arm is a pointer 63, and adjacent this pointer is a dial 64 provided with numerical legends for indicating different degrees of pressure in pounds per square inch, as may be understood from Figs. 4 and 6, these legends being mounted upon an arcuate member 64 to facilitate a reading. The pointer 63 also serves as a contact member, and disposed adjacent the path of its travel is a sector 65 of conducting material, insulated from surrounding parts, and secured to the sector 65 is a wire 67 which leads to a connector 66. To this connector some one of the four wires 17, 29, 33 or 34 is secured.

Each of the four wheels carries one of the valves 19, each having its own indicating mechanism including the sector 65 and pointer 63.

The parts are so arranged that the operator, by glancing at any one of the four valves carried by the four wheels of the automobile, can read off the condition of the air pressure within the tire of the wheel in question.

Again, the operator by glancing at the annunciator can tell, from the disclosure of some one or more of the legends associated with the respective drops, that the air pressure in one or more of the tires is too low. Ordinarily, however, if the parts are properly adjusted and everything works as desired, the valve will automatically relieve the pressure in any tire in which the pressure becomes excessive, and this automatic relief may be brought about before the annunciator is affected. In this event, the annunciator will register an indication only in case of failure of the valve to work properly, or of deflation of the tire.

The operation of our device is as follows: The parts being assembled and arranged as above described, the various tires are inflated. This is done by removing the dome 42 of the air valve associated with each tire, and filling the tire with air which enters through the sleeve 47 and is prevented from retrogressing by action of the valve member 60. The tension of the spring 49 having been properly adjusted, the diaphragm 43 does not yield, under pressure of air within the tire, sufficiently to allow the sleeve 47 to move outwardly to such distance as will allow the rod 58 to engage the screw 54. If, however, the pressure within the tire becomes excessive, either due to vicissitudes of travel, or to expansion of air within the tire owing to the increasing temperature, the diaphragm 43 yields and becomes dished in form. This allows the sleeve 47 to move outwardly so that the rod 58 engages the bolt 54, and the valve 51 is thus disconnected from its seat. This allows the excess of air to escape—or in other words, the valve " pops ". Manifestly, by adjusting the tension of the spring 49, and by adjusting the position of the bolt 54, the valve can be made to pop when the air pressure within the tire reaches a predetermined limit.

As the sleeve 47 moves outwardly, as just described, the pointer 63 swings radially around, and the operator, by noting the position of the pointer relatively to the arcuate member 64, can ascertain at a glance the amount of air pressure within the particular tire associated with this particular arcuate member. If the air pressure within the tire drops down below a predetermined normal limit, the pointer 63 comes into engagement with the contact sector 65. This completes an electric circuit through the annunciator 32, so that one or the other of the legends of the annunciator is displayed. The operator is thus apprised by the annunciator that the air pressure in the tire thus affected is down below the normal limit. The operator, in filling each tire, notes the travel of the pointer 63 and stops the inflow of air as soon as sufficient pressure is attained.

Suppose, now, that the wheel of the vehicle drops too low. The pointer 63 of the valve in question is brought into engagement with the contact sector 65 associated with it, and a circuit is completed as follows: source of electricity (not shown), pointer 63, sector 65, wire 67, connector 66, wire 29 to annunciator, return wire 33ª to frame of vehicle, thence to source of electricity and back to pointer 63. The circuit thus traced through the annunciator causes the latter to exhibit the legend FR, thus indicating to the operator that the tire of the right front wheel is deflated, or at least that its air pressure is below normal.

We do not limit ourselves to the precise arrangement shown, as variations may be made therein without departing from the spirit of our invention.

Having thus described our invention, what we claim as new and desire to secure by Letters Patent is as follows:

1. An indicating system of the character described comprising a plurality of air valves having means for indicating the pressure of air in the wheels to which the valves are applied, an annunciator, and a plurality of electric circuits each leading from said annunciator to an indicating means of said valves, and controlled by the said indicating means for actuating said annunciator.

2. In an indicating system of the character described, the combination of a pneumatic wheel, a slip ring carried thereby, a brush engaging said slip ring, an annunciator, electrical connections from said brush and said slip ring to said annunciator, and an air valve carried by said wheel and controllable by air pressure of the wheel, said valve having means for indicating the air pressure and serving to close the circuits of said electrical connections.

3. In an indicating system of the character described, the combination with a plurality of pneumatic wheels, of a valve for each wheel for relieving the wheel of excessive pressure, an indicating device operated by the valve for indicating the air pressure of the wheel, an annunciator, and a plurality of electrical circuits each leading from the annunciator to the indicating device and controlled thereby.

4. In an indicating system of the character described the combination with a plurality of pneumatic wheels, of a valve for each wheel for relieving the wheel of excessive pressure, an indicating device having a dial and a pointer for indicating the air pressure of the wheel, the pointer of the indicating device serving as a contact member and operated by the valve, an annunciator, and a plurality of electrical circuits each leading from the annunciator to the indicating device of the valve.

In testimony whereof we have signed our names to this specification each in the presence of two subscribing witnesses.

HERVEY BOWES ASHELMAN.
JOHN SANDFORD JOHNSON.

Witnesses to signature of Hervey B. Ashelman:
   T. H. McENROE,
   ALLEN W. WOOD.

Witnesses to signature of John S. Johnson:
   L. A. SNIDER,
   R. P. HALL.